(12) United States Patent
Wi

(10) Patent No.: US 9,360,106 B2
(45) Date of Patent: Jun. 7, 2016

(54) HYDRAULIC PRESSURE SUPPLY SYSTEM OF AUTOMATIC TRANSMISSION

(71) Applicant: Hyundai Motor Company, Seoul (KR)

(72) Inventor: Taehwan Wi, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 347 days.

(21) Appl. No.: 14/145,298

(22) Filed: Dec. 31, 2013

(65) Prior Publication Data

US 2015/0075151 A1 Mar. 19, 2015

(30) Foreign Application Priority Data

Sep. 17, 2013 (KR) .................. 10-2013-0112195

(51) Int. Cl.
| F16D 31/02 | (2006.01) |
| F16H 61/00 | (2006.01) |
| F16H 61/4017 | (2010.01) |
| F16H 61/4026 | (2010.01) |
| F16H 61/4061 | (2010.01) |
| F04C 2/344 | (2006.01) |

(52) U.S. Cl.
CPC .......... *F16H 61/0025* (2013.01); *F04C 2/3446* (2013.01); *F16H 61/4017* (2013.01); *F16H 61/4026* (2013.01); *F16H 61/4061* (2013.01); *F04C 2270/185* (2013.01); *F15B 2211/45* (2013.01); *F16H 2061/0015* (2013.01); *F16H 2061/0037* (2013.01)

(58) Field of Classification Search
CPC ............... F15B 11/165; F15B 2211/45; F16H 61/0021; F16H 61/0025; F16H 2061/0037
See application file for complete search history.

(56) References Cited

U.S. PATENT DOCUMENTS

| 9,175,766 B2* | 11/2015 | Wi | ................. F16H 61/005 |
| 2015/0075152 A1* | 3/2015 | Wi | ............... F16H 61/0025 60/464 |
| 2015/0075153 A1* | 3/2015 | Wi | ............... F16H 61/0025 60/464 |
| 2015/0075154 A1* | 3/2015 | Wi | ............... F16H 61/0055 60/464 |

FOREIGN PATENT DOCUMENTS

| JP | 2009-270657 A | 11/2009 |
| JP | 5012322 B2 | 6/2012 |
| KR | 10-2008-0035381 A | 4/2008 |

* cited by examiner

*Primary Examiner* — Michael Leslie
(74) *Attorney, Agent, or Firm* — Morgan, Lewis & Bockius LLP

(57) ABSTRACT

A hydraulic pressure supply system supplies hydraulic pressure generated at a hydraulic pump provided with first and second pump chambers formed therein to a high pressure portion and a low pressure portion of the automatic transmission through a high-pressure regulator valve, first and second switch valves, and a low-pressure regulator valve.

18 Claims, 4 Drawing Sheets

HYDRAULIC PRESSURE SUPPLY SYSTEM OF AUTOMATIC TRANSMISSION

CROSS-REFERENCE TO RELATED APPLICATION

The present application claims priority to Korean Patent Application No. 10-2013-0112195 filed on Sep. 17, 2013, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which can achieve a two circuit mode and a half discharge mode.

2. Description of Related Art

A gear pump is mainly used as a hydraulic pump applied to a hydraulic pressure supply system of an automatic transmission for a vehicle. However, a vane pump that can supply sufficient oil at a low speed region is recently used.

The vane pump increases discharge amount in proportion to a rotation speed thereof. If the vane pump is controlled to supply the sufficient oil at the low speed region, unnecessarily much oil is supplied and thereby causes driving loss of the pump at a high speed region.

Therefore, the vane pump includes first and second pump chambers disposed on a shaft of a rotor so as to recirculate surplus oil at the high speed region.

The first pump chamber is a main pump chamber, and hydraulic pressure generated at the first pump chamber is supplied to a high pressure portion (friction members, pulleys and so on).

In addition, the second pump chamber is a sub pump chamber, and hydraulic pressure generated at the second pump chamber is supplied selectively to the high pressure portion (friction members, pulleys and so on) or a low pressure portion (torque converter, cooling device, lubrication device and so on), or is recirculated.

In further detail, the hydraulic pressure generated at the first pump chamber and the second pump chamber is supplied to the high pressure portion if an engine speed is low, but the hydraulic pressure generated at the second pump chamber is recirculated to an inlet side if the engine speed is high. Therefore, driving loss of the pump may be minimized and fuel economy may be enhanced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of improving fuel economy due to optimal control by achieving a two circuit mode and a half discharge mode according to driving condition of a vehicle.

In an aspect of the present invention, a hydraulic pressure supply system of an automatic transmission for a vehicle, may include a hydraulic pump provided with first and second pump chambers formed therein, wherein the first and second pump chambers are connected to an oil pan respectively through first and second input lines and discharge generated hydraulic pressure respectively through first and second discharge lines, a high-pressure regulator valve disposed on a high-pressure line connected to a high pressure portion, regulating hydraulic pressure supplied from the first and second pump chambers to the high pressure portion though the high-pressure line to stable hydraulic pressure, and supplying surplus hydraulic pressure to a low pressure portion through a first recirculation line connected to high-pressure regulator valve, a first switch valve connecting the second discharge line connected to the second pump chamber selectively to a first low-pressure line or a first bypass line connected to the first input line, and supplying the hydraulic pressure generated at the second pump chamber selectively to the first low-pressure line or the first bypass line, a second switch valve connecting the first low-pressure line selectively to a second bypass line connected to the high-pressure line or a second low-pressure line, and supplying the hydraulic pressure supplied through the first low-pressure line selectively to the second bypass line or the second low-pressure line, and a low-pressure regulator valve connecting the second low-pressure line to a third low-pressure line connected to the low pressure portion, regulating the hydraulic pressure supplied to the low pressure portion through the second low-pressure line and the third low-pressure line to be stable, and recirculating surplus hydraulic pressure to the first input line through a second recirculation line.

The high-pressure regulator valve is controlled by control pressure supplied through a first solenoid valve and elastic force of an elastic member so as to supply the surplus hydraulic pressure of the high pressure portion to the low pressure portion through the first recirculation line.

The low-pressure regulator valve is controlled by control pressure supplied through a first solenoid valve and elastic force of an elastic member counteracting against the control pressure so as to recirculate the surplus hydraulic pressure of the low pressure portion to the first input line through the second recirculation line.

The second recirculation line is connected to the low-pressure regulator valve and the first input line.

The first bypass line is connected to the first switch valve and the second recirculation line.

The first switch valve is controlled by control pressure of a second solenoid valve and elastic force of an elastic member counteracting against the control pressure.

The second switch valve is controlled by the control pressure of the second solenoid valve and elastic force of an elastic member counteracting against the control pressure.

Elastic force of the elastic member applied to the first switch valve is weaker than elastic force of the elastic member applied to the second switch valve.

The second switch valve is controlled by control pressure of a third solenoid valve and elastic force of an elastic member counteracting against the control pressure.

In another aspect of the present invention, a hydraulic pressure supply system of an automatic transmission for a vehicle, may include a hydraulic pump provided with first and second pump chambers formed therein, wherein the first and second pump chambers are connected to an oil pan respectively through first and second input lines and discharge generated hydraulic pressure respectively through first and second discharge lines, a high-pressure regulator valve disposed on a high-pressure line connected to a high pressure portion, regulating hydraulic pressure supplied from the first and second pump chambers to the high pressure portion though the high-pressure line to stable hydraulic pressure, and supplying surplus hydraulic pressure to a low pressure portion through a first recirculation line connected to high-pressure regulator valve, a first switch valve connecting the second discharge line selectively to a first low-pressure line or a first bypass line, and supplying the hydraulic pressure generated at the second pump chamber selectively to the first low-pressure line or the first bypass line, a second switch valve connecting the first low-pressure line selectively to a second bypass line connected to the high-pressure line or a second low-pressure line, and supplying the hydraulic pressure supplied through the first low-pressure line selectively to the second bypass line or the second low-pressure line, and a low-pressure regulator valve connecting the second low-pressure line to a third low-pressure line connected to the low pressure portion, regulating the hydraulic pressure supplied to the low pressure portion through the second low-pressure line and the third low-pressure line to be stable, and recirculating surplus hydraulic pressure to the first input line through a second recirculation line, wherein the first bypass line is connected to the second recirculation line.

The high-pressure regulator valve and the low-pressure regulator valve are controlled by a first solenoid valve, and the first switch valve and the second switch valve are controlled by a second solenoid valve.

The high-pressure regulator valve and the low-pressure regulator valve are controlled by a first solenoid valve, the first switch valve is controlled by a second solenoid valve, and the second switch valve is controlled by a third solenoid valve.

The high-pressure regulator valve is controlled by control pressure supplied through a first solenoid valve and elastic force of an elastic member so as to supply the surplus hydraulic pressure of the high pressure portion to the low pressure portion through the first recirculation line.

The low-pressure regulator valve is controlled by control pressure supplied through a first solenoid valve and elastic force of an elastic member counteracting against the control pressure so as to recirculate the surplus hydraulic pressure of the low pressure portion to the first input line through the second recirculation line.

The first switch valve is controlled by control pressure of a second solenoid valve and elastic force of an elastic member counteracting against the control pressure.

The second switch valve is controlled by the control pressure of the second solenoid valve and elastic force of an elastic member counteracting against the control pressure.

Elastic force of the elastic member applied to the first switch valve is weaker than elastic force of the elastic member applied to the second switch valve.

The second switch valve is controlled by control pressure of a third solenoid valve and elastic force of an elastic member counteracting against the control pressure.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
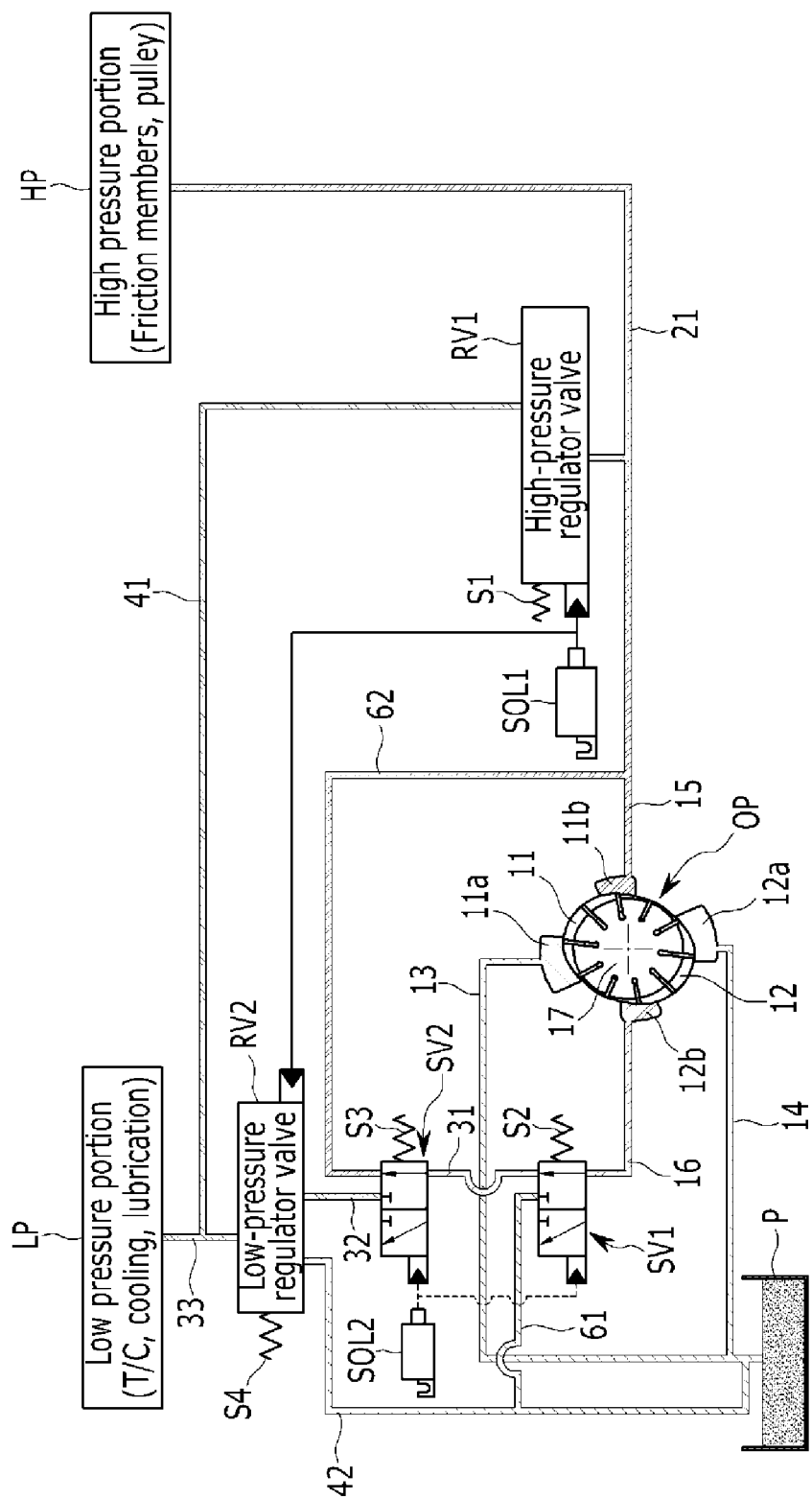
FIG. 1 is a schematic diagram of a hydraulic pressure supply system according to the various exemplary embodiments of the present invention and illustrates oil flow at a full discharge mode.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system according to the first exemplary embodiment of the present invention and illustrates oil flow at a full discharge mode.

Referring to FIG. 1, a hydraulic pressure supply system according to the first exemplary embodiment of the present invention includes a low pressure portion LP and a high pressure portion HP. Therefore, hydraulic pressure generated at a hydraulic pump OP is supplied simultaneously to the low pressure portion LP and the high pressure portion HP or only to the high pressure portion HP.

The low pressure portion LP represents a portion to which a low pressure facilitating operation of the torque converter (T/C) and cooling and lubrication is supplied, and the high pressure portion HP represents a portion to which a high pressure facilitating operation of a plurality of friction members that is selectively operated when shifting or a pulley (e.g., pulley for a CVT) is supplied.

The hydraulic pressure supply system according to the first exemplary embodiment of the present invention including the low pressure portion LP and the high pressure portion HP includes a hydraulic pump OP, a high-pressure regulator valve RV1, first and second switch valves SV1 and SV2, and a low-pressure regulator valve RV2.

The hydraulic pump OP is a vane pump and includes first and second pump chambers 11 and 12 formed therein. The first and second pump chambers 11 and 12 receive oil in an oil pan P respectively through first and second input lines 13 and 14, and hydraulic pressure generated at the first and second pump chambers 11 and 12 is supplied to the high pressure portion HP and the low pressure portion LP respectively through first and second discharge lines 15 and 16.

The high-pressure regulator valve RV1 is disposed on the high-pressure line 21 connected to the high pressure portion HP, regulates the hydraulic pressure supplied from the first and second pump chambers 11 and 12 to the high pressure portion HP through the high-pressure line 21 to stable hydraulic pressure, and supplies surplus hydraulic pressure to the low pressure portion LP through a first recirculation line 41.

The first switch valve SV1 connects the second discharge line 16 selectively to a first low-pressure line 31 or a first bypass line 61 connected to a second recirculation line 42. The first switch valve SV1 supplies the hydraulic pressure generated at the second pump chamber 12 selectively to the first low-pressure line 31 or the first bypass line 61.

The second switch valve SV2 connects the first low-pressure line 31 selectively to a second bypass line 62 connected to the high-pressure line 21 or a second low-pressure line 32. The second switch valve SV2 supplies the hydraulic pressure supplied through the first low-pressure line 31 selectively to the second bypass line 62 or the second low-pressure line 32.

The low-pressure regulator valve RV2 connects the second low-pressure line 32 to a third low-pressure line 33 connected to the low pressure portion LP, regulates the hydraulic pressure supplied to the low pressure portion LP through the second low-pressure line 32 and the third low-pressure line 33 to be stable, and recirculates surplus hydraulic pressure to the oil pan P through the second recirculation line 42.

The hydraulic pressure supply system according to the first exemplary embodiment of the present invention will be described in further detail.

The hydraulic pump OP is a vane pump and includes the first and second pump chambers 11 and 12 formed therein. The first pump chamber 11 and the second pump chamber 12 are formed symmetrically with respect to a rotor 17 in an axial direction.

The first pump chamber 11 is connected to the first input port 11a and the first discharge port 11b, and the second pump chamber 12 is connected to the second input port 12a and the second discharge port 12b.

The first and second input ports 11a and 12a are connected to the oil pan P respectively through the first and second input lines 13 and 14, and the first and second discharge ports 11b and 12b are connected respectively to the first and second discharge lines 15 and 16.

The first discharge line 15 is always connected to the high pressure portion HP through a high-pressure line 21, and the second discharge line 16 is connected to the first switch valve SV1.

In addition, the high-pressure regulator valve RV 1 is disposed on the high-pressure line 21 and is controlled by a first solenoid valve SOL1.

That is, the high-pressure regulator valve RV1 is controlled by control pressure supplied from the first solenoid valve SOL1 and elastic force of a first elastic member S1. The high-pressure regulator valve RV1 regulates the hydraulic pressure supplied to the high pressure portion HP to be stable and recirculates the surplus hydraulic pressure at a regulating process to the low pressure portion LP through the first recirculation line 41.

At this time, the first recirculation line 41 is connected between the high-pressure regulator valve RV1 and the third low-pressure line 33, and is configured to increase oil amount of the low pressure portion LP.

In addition, the first switch valve SV1 is operated at a half discharge mode. The first switch valve SV1 is connected to the second discharge line 16, is connected to the second switch valve SV2 through the first low-pressure line 31, and is connected to the second recirculation line 42 through the first bypass line 61. The first switch valve SV1 is controlled by a second solenoid valve SOL2.

That is, the first switch valve SV1 is controlled by control pressure supplied from the second solenoid valve SOL2 and elastic force of a second elastic member S2 counteracting against the control pressure so as to connect the second discharge line 16 selectively to the first low-pressure line 31 or the first bypass line 61.

The first switch valve SV1 supplies the hydraulic pressure supplied from the second discharge line 16 to the second switch valve SV2 through the first low-pressure line 31 or recirculates the hydraulic pressure supplied from the second discharge line 16 to the second recirculation line 42 through the first bypass line 61.

In addition, the second switch valve SV2 is operated at a two circuit mode. The second switch valve SV2 is connected to the first switch valve SV1 through the first low-pressure line 31, is connected to the low-pressure regulator valve RV2 through the second low-pressure line 32, and is connected to the high-pressure line 21 through the second bypass line 62. The second switch valve SV2 is controlled by the second solenoid valve SOL2.

That is, the second switch valve SV2 is controlled by the control pressure supplied from the second solenoid valve SOL2 and elastic force of a third elastic member S3 counteracting against the control pressure so as to connect the first low-pressure line 31 selectively to the second low-pressure line 32 or the second bypass line 62.

The second switch valve 16 supplies the hydraulic pressure supplied to the first low-pressure line 31 to the low-pressure regulator valve RV2 through the second low-pressure line 32 or supplies the hydraulic pressure supplied to the first low-pressure line 31 to the high-pressure line 21 through the second bypass line 62.

The elastic force of the third elastic member S3 applied to the second switch valve SV2 may be weaker than the elastic force of the second elastic member S2 applied to the first switch valve SV1.

Therefore, if the control pressure is supplied from the second solenoid valve SOL2, the second switch valve SV2 is firstly operated. After that, if the control pressure of the second solenoid valve SOL2 further increases, the first switch valve SV1 is operated. Therefore, as rotation speed of an engine increases, the half discharge mode is achieved after the two circuit mode is achieved.

In addition, the low-pressure regulator valve RV2 is connected to the second switch valve SV2 through the second low-pressure line 32, is connected to the low pressure portion LP through the third low-pressure line 33, and is connected to the oil pan P through the second recirculation line 42. The low-pressure regulator valve RV2 is controlled by the first solenoid valve SOL1.

That is, the low-pressure regulator valve RV2 is controlled by the control pressure supplied from the first solenoid valve SOL1 and elastic force of a fourth elastic member S4 counteracting against the control pressure so as to regulate the hydraulic pressure supplied from the second low-pressure line 32 to be stable and to supply the regulated hydraulic pressure to the low pressure portion LP through the third low-pressure line 33.

In addition, the surplus hydraulic pressure of the low pressure portion LP at the regulating process of the low-pressure regulator valve RV2 is recirculated to the oil pan P through the second recirculation line 42.

The hydraulic pressure supply system according to the first exemplary embodiment of the present invention is controlled to be operated at the full discharge mode at initial starting and when stopped.

Referring to FIG. 1, the first switch valve SV1 connects the second discharge line 16 with the first low-pressure line 31 and the second switch valve SV2 connects the first low-pressure line 31 with the second bypass line 62 at a full discharge mode.

Therefore, the hydraulic pressure generated at the first and second pump chambers 11 and 12 of the hydraulic pump OP is entirely supplied to the high pressure portion HP, and the surplus hydraulic pressure of the high-pressure regulator valve RV1 is supplied to the low pressure portion LP through the first recirculation line 41.

Figure 2:
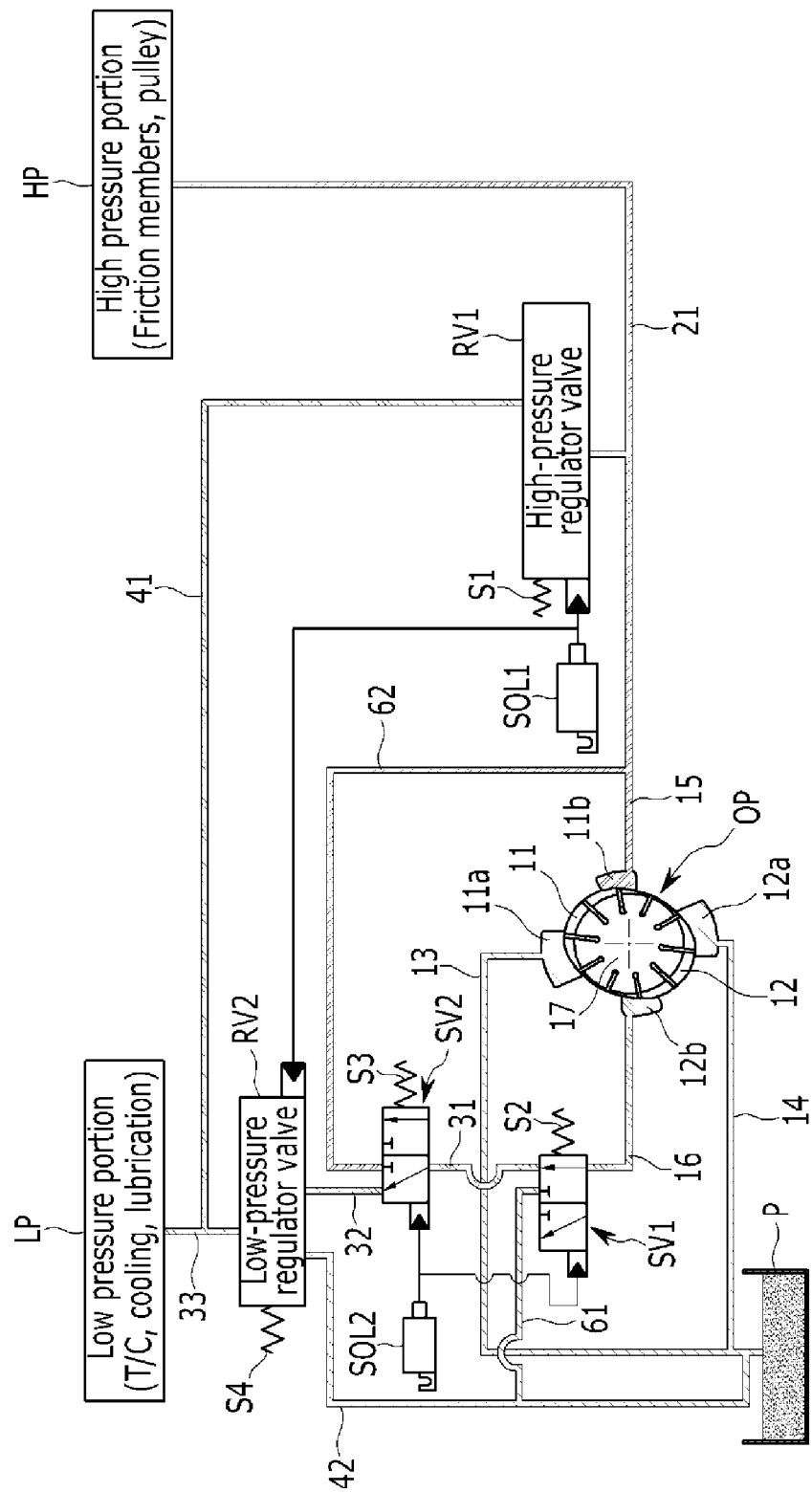
FIG. 2 is a schematic diagram of a hydraulic pressure supply system according to the various exemplary embodiments of the present invention and illustrates oil flow at a two circuit mode.

FIG. 2 is a schematic diagram of a hydraulic pressure supply system according to the first exemplary embodiment of the present invention and illustrates oil flow at a two circuit mode.

Referring to FIG. 2, if the engine speed rises during the vehicle runs at the full discharge mode, the second solenoid valve SOL2 supplies low control pressure so as to operate only the second switch valve SV2 according to driving condition. Therefore, the two circuit mode is achieved.

At this time, the first switch valve SV1 connects the second discharge line 16 with the first low-pressure line 31 and the second switch valve SV2 connects the first low-pressure line 32 with the second low-pressure line 32.

Therefore, the hydraulic pressure generated at the first pump chamber 11 is supplied to the high pressure portion HP through the first discharge line 15 and the high-pressure line 21, and the hydraulic pressure generated at the second pump chamber 12 is supplied to the low pressure portion LP through the first, second, and third low-pressure lines 31, 32, and 33, the first and second switch valves SV1 and SV2, and the low-pressure regulator valve RV2.

The hydraulic pressure generated at the first and second pump chambers 11 and 12 of the hydraulic pump OP is supplied respectively to the high pressure portion HP and the low pressure portion LP through two circuits at the two circuit mode. In addition, the surplus hydraulic pressure of the high pressure portion HP is additionally supplied to the low pressure portion LP through the first recirculation line 41.

Figure 3:
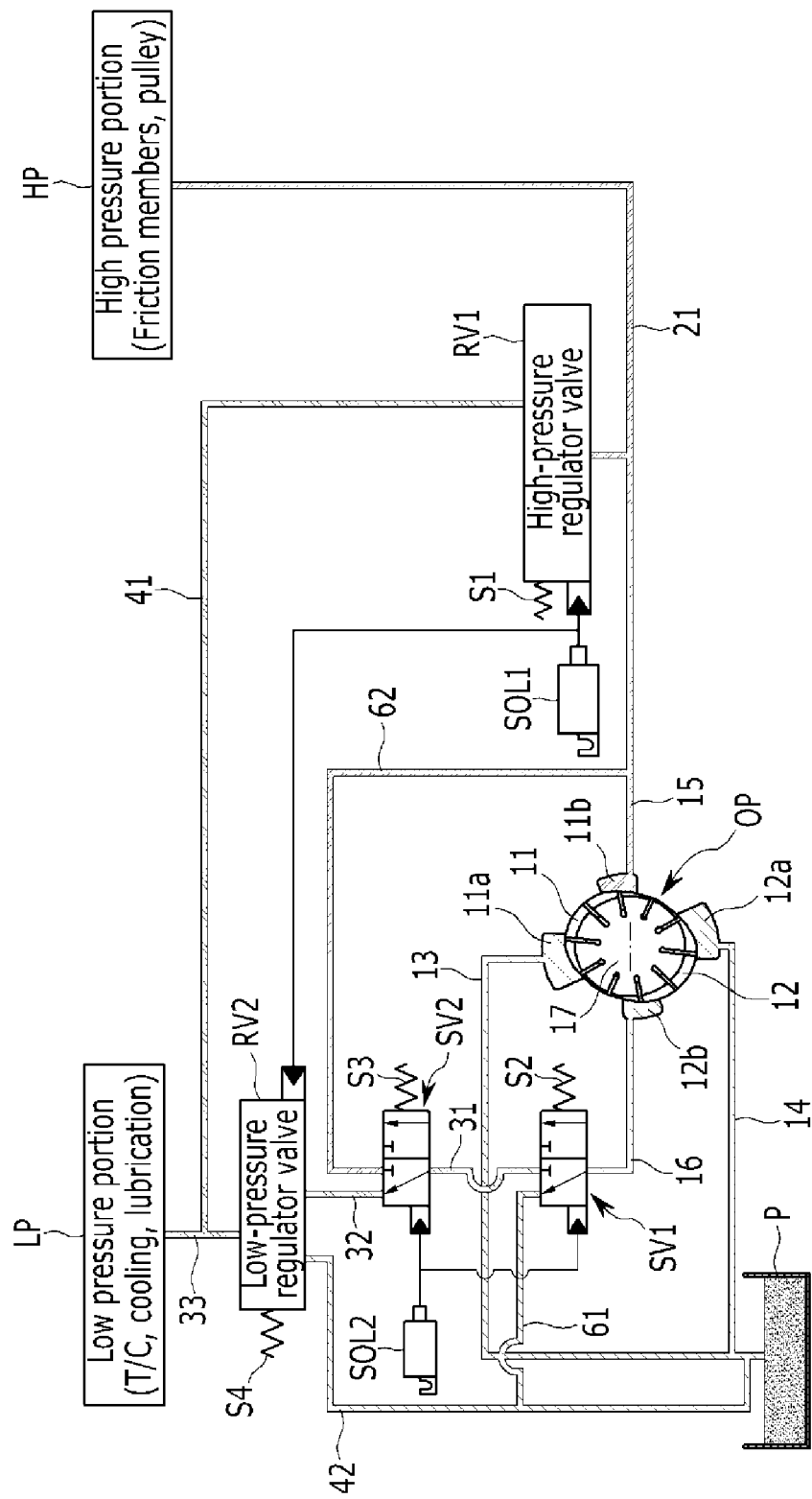
FIG. 3 is a schematic diagram of a hydraulic pressure supply system according to the various exemplary embodiments of the present invention and illustrates oil flow at a half discharge mode.

FIG. 3 is a schematic diagram of a hydraulic pressure supply system according to the first exemplary embodiment of the present invention and illustrates oil flow at a half discharge mode.

Referring to FIG. 3, if the engine speed is greatly increased due to high-speed driving during the vehicle runs at the two circuit mode, the second solenoid valve SOL2 supplies high control pressure so as to operate both of the first and second switch valves SV1 and SV2 according to the driving condition. Therefore, the half discharge mode is achieved.

Therefore, the first switch valve SV1 connects the second discharge line 16 with the first bypass line 61 and the second switch valve SV2 connects the first low-pressure line 32 with the second low-pressure line 32.

Therefore, the hydraulic pressure generated at the first pump chamber 11 is supplied to the high pressure portion HP through the first discharge line 15 and the high-pressure line 21, and the hydraulic pressure generated at the second pump chamber 12 is recirculated to the oil pan P through the first bypass line 61 and the second recirculation line 42.

Since the hydraulic pressure generated at the second pump chamber 12 of the hydraulic pump OP is recirculated to an input side of the hydraulic pump OP at the half discharge mode, driving torque of the hydraulic pump OP may be reduced, fuel economy may be improved, and cavitation of the hydraulic pump OP when rotating with high speed may be prevented.

Meanwhile, the surplus hydraulic pressure of the high pressure portion HP is supplied to the low pressure portion LP through the first recirculation line 41.

The hydraulic pressure supply system according to the first exemplary embodiment of the present invention may improve fuel economy by supplying hydraulic pressure at an optimum mode according to the engine speed and the driving condition of the vehicle.

That is, the hydraulic pressure generated at the first and second pump chambers 11 and 12 of the hydraulic pump OP is entirely supplied to the high pressure portion HP through the high-pressure line 21, and the surplus hydraulic pressure of the high-pressure regulator valve RV1 is supplied to the low pressure portion LP at the full discharge mode.

Since the hydraulic pressure generated at the hydraulic pump OP is entirely supplied to the high pressure portion HP at the full discharge mode, responsiveness to shifting may be enhanced and smooth start may be supported.

In addition, the hydraulic pressure generated at the first pump chamber 11 of the hydraulic pump OP is supplied to the high pressure portion HP through the high-pressure line 21, and the hydraulic pressure generated at the second pump chamber 12 is supplied to the low pressure portion LP through the first, second, and third low-pressure lines 31, 32, and 33, the first and second switch valves SV1 and SV2, and the low-pressure regulator valve RV2 at the two circuit mode.

Since oil amount of the low pressure portion LP increases and oil amount demanded at the high pressure portion HP is reduced even though oil amount necessary for the transmission is supplied at the two circuit mode, the engine speed for entering the half discharge mode may be lowered and fuel economy may be enhanced.

In addition, the hydraulic pressure generated at the first pump chamber 11 of the hydraulic pump OP is supplied to the high pressure portion HP through the high-pressure line 21, and the hydraulic pressure generated at the second pump chamber 12 is recirculated to the input side of the hydraulic pump OP through the first bypass line 61 and the second recirculation line 42.

Since the hydraulic pressure generated at the first pump chamber 11 is supplied to the high pressure portion HP, a portion of the hydraulic pressure is supplied to the low pressure portion LP, and the hydraulic pressure generated at the second pump chamber 12 is recirculated to the hydraulic pump OP at the half discharge mode, driving torque of the hydraulic pump OP may be reduced, fuel economy may be enhanced, and cavitation of the hydraulic pump OP may be prevented when rotating with high speed.

The hydraulic pressure supply system according to the first exemplary embodiment of the present invention can use the control pressure of one solenoid valve when a mode is changed to the two circuit mode and the half discharge mode. Therefore, the hydraulic pressure may be supplied at the optimum mode according to the engine speed and the driving condition of the vehicle and fuel economy may be improved.

Figure 4:
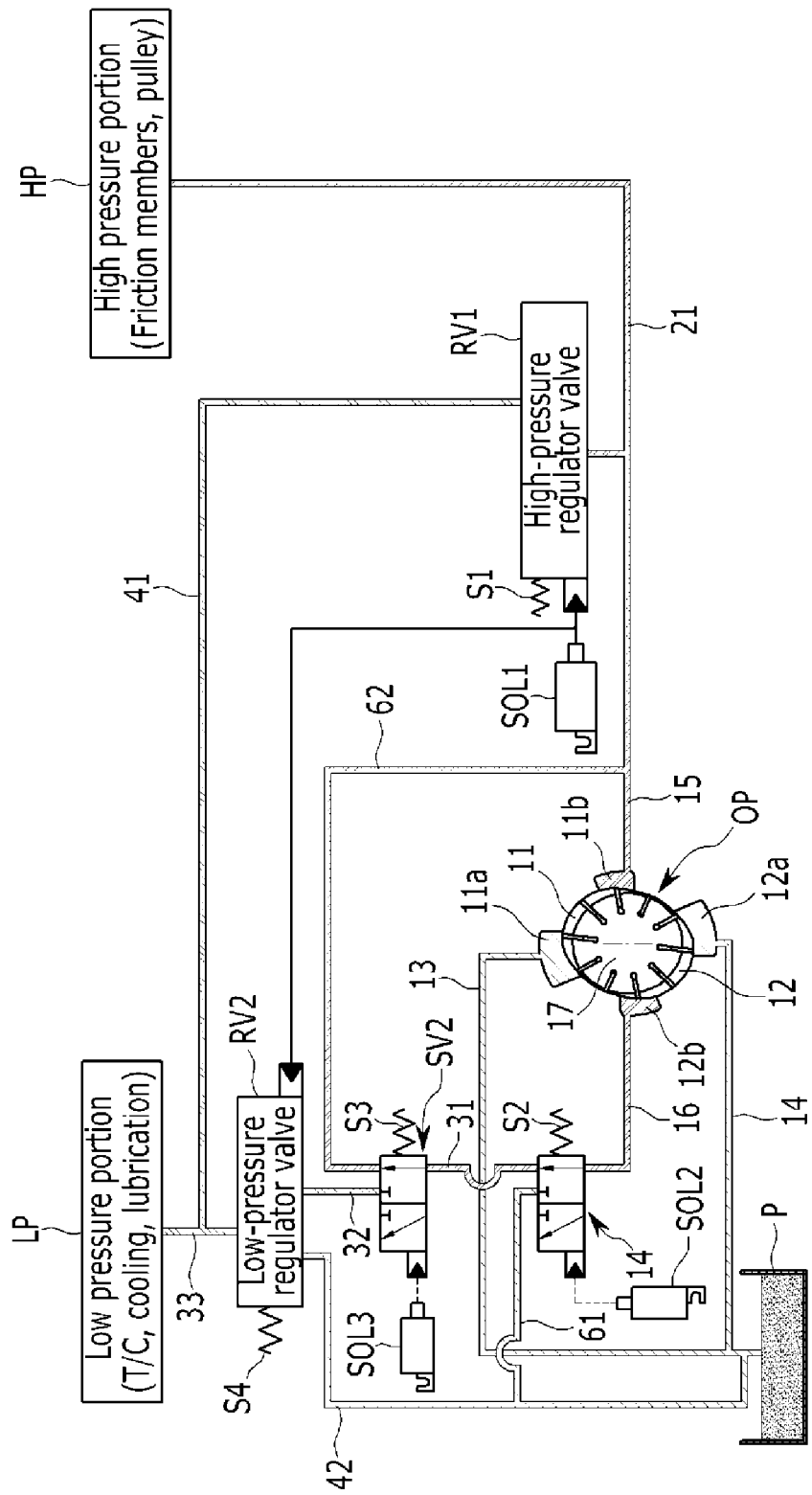
FIG. 4 is a schematic diagram of a hydraulic pressure supply system according to the various exemplary embodiments of the present invention and illustrates oil flow at a full discharge mode.

FIG. 4 is a schematic diagram of a hydraulic pressure supply system according to the second exemplary embodiment of the present invention and illustrates oil flow at a full discharge mode.

Referring to FIG. 4, the first and second switch valves SV1 and SV2 are simultaneously controlled by the second solenoid valve SOL2 in the first exemplary embodiment, but the first and second switch valves SV1 and SV2 are controlled respectively by second and third solenoid valves SOL2 and SOL3 in the second exemplary embodiment.

Since functions of the second exemplary embodiment are the same as those of the first exemplary embodiment except the above-described differences, detailed description thereof will be omitted.

Since the full discharge mode, the two circuit mode and the half discharge mode can be achieved according to the driving condition by using two switch valves, oil flow may be optimally controlled according to the exemplary embodiments of the present invention.

Since the two circuit mode and the half discharge mode are optimally used according to the driving condition, driving loss of the pump may be minimized and fuel economy may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A hydraulic pressure supply system of an automatic transmission for a vehicle, comprising:
    a hydraulic pump provided with first and second pump chambers formed therein, wherein the first and second pump chambers are connected to an oil pan respectively through first and second input lines and discharge generated hydraulic pressure respectively through first and second discharge lines;
    a high-pressure regulator valve disposed on a high-pressure line connected to a high pressure portion, regulating hydraulic pressure supplied from the first and second pump chambers to the high pressure portion though the high-pressure line to stable hydraulic pressure, and supplying surplus hydraulic pressure to a low pressure portion through a first recirculation line connected to the high-pressure regulator valve;
    a first switch valve connecting the second discharge line connected to the second pump chamber selectively to a first low-pressure line or a first bypass line connected to the first input line, and supplying the hydraulic pressure generated at the second pump chamber selectively to the first low-pressure line or the first bypass line;
    a second switch valve connecting the first low-pressure line selectively to a second bypass line connected to the high-pressure line or a second low-pressure line, and supplying the hydraulic pressure supplied through the first low-pressure line selectively to the second bypass line or the second low-pressure line; and
    a low-pressure regulator valve connecting the second low-pressure line to a third low-pressure line connected to the low pressure portion, regulating the hydraulic pressure supplied to the low pressure portion through the second low-pressure line and the third low-pressure line to be stable, and recirculating surplus hydraulic pressure to the first input line through a second recirculation line.

2. The hydraulic pressure supply system of claim 1, wherein the high-pressure regulator valve is controlled by control pressure supplied through a first solenoid valve and elastic force of an elastic member so as to supply the surplus hydraulic pressure of the high pressure portion to the low pressure portion through the first recirculation line.

3. The hydraulic pressure supply system of claim 1, wherein the low-pressure regulator valve is controlled by control pressure supplied through a first solenoid valve and elastic force of an elastic member counteracting against the control pressure so as to recirculate the surplus hydraulic pressure of the low pressure portion to the first input line through the second recirculation line.

4. The hydraulic pressure supply system of claim 3, wherein the second recirculation line is connected to the low-pressure regulator valve and the first input line.

5. The hydraulic pressure supply system of claim 3, wherein the first bypass line is connected to the first switch valve and the second recirculation line.

6. The hydraulic pressure supply system of claim 1, wherein the first switch valve is controlled by control pressure of a second solenoid valve and elastic force of an elastic member counteracting against the control pressure.

7. The hydraulic pressure supply system of claim 6, wherein the second switch valve is controlled by the control pressure of the second solenoid valve and elastic force of an elastic member counteracting against the control pressure.

8. The hydraulic pressure supply system of claim 7, wherein elastic force of the elastic member applied to the first switch valve is weaker than elastic force of the elastic member applied to the second switch valve.

9. The hydraulic pressure supply system of claim 6, wherein the second switch valve is controlled by control pressure of a third solenoid valve and elastic force of an elastic member counteracting against the control pressure.

10. A hydraulic pressure supply system of an automatic transmission for a vehicle, comprising:
    a hydraulic pump provided with first and second pump chambers formed therein, wherein the first and second pump chambers are connected to an oil pan respectively through first and second input lines and discharge generated hydraulic pressure respectively through first and second discharge lines;
    a high-pressure regulator valve disposed on a high-pressure line connected to a high pressure portion, regulating hydraulic pressure supplied from the first and second pump chambers to the high pressure portion though the high-pressure line to stable hydraulic pressure, and supplying surplus hydraulic pressure to a low pressure portion through a first recirculation line connected to the high-pressure regulator valve;
    a first switch valve connecting the second discharge line selectively to a first low-pressure line or a first bypass line, and supplying the hydraulic pressure generated at the second pump chamber selectively to the first low-pressure line or the first bypass line;
    a second switch valve connecting the first low-pressure line selectively to a second bypass line connected to the high-pressure line or a second low-pressure line, and supplying the hydraulic pressure supplied through the first low-pressure line selectively to the second bypass line or the second low-pressure line; and a low-pressure regulator valve connecting the second low-pressure line to a third low-pressure line connected to the low pressure portion, regulating the hydraulic pressure supplied to the low pressure portion through the second low-pressure line and the third low-pressure line to be stable, and recirculating surplus hydraulic pressure to the first input line through a second recirculation line, wherein the first bypass line is connected to the second recirculation line.

11. The hydraulic pressure supply system of claim 10, wherein the high-pressure regulator valve and the low-pressure regulator valve are controlled by a first solenoid valve, and the first switch valve and the second switch valve are controlled by a second solenoid valve.

12. The hydraulic pressure supply system of claim 10, wherein the high-pressure regulator valve and the low-pressure regulator valve are controlled by a first solenoid valve, the first switch valve is controlled by a second solenoid valve, and the second switch valve is controlled by a third solenoid valve.

13. The hydraulic pressure supply system of claim 10, wherein the high-pressure regulator valve is controlled by control pressure supplied through a first solenoid valve and elastic force of an elastic member so as to supply the surplus hydraulic pressure of the high pressure portion to the low pressure portion through the first recirculation line.

14. The hydraulic pressure supply system of claim 10, wherein the low-pressure regulator valve is controlled by control pressure supplied through a first solenoid valve and elastic force of an elastic member counteracting against the control pressure so as to recirculate the surplus hydraulic pressure of the low pressure portion to the first input line through the second recirculation line.

15. The hydraulic pressure supply system of claim 10, wherein the first switch valve is controlled by control pressure of a second solenoid valve and elastic force of an elastic member counteracting against the control pressure.

16. The hydraulic pressure supply system of claim 15, wherein the second switch valve is controlled by the control pressure of the second solenoid valve and elastic force of an elastic member counteracting against the control pressure.

17. The hydraulic pressure supply system of claim 16, wherein elastic force of the elastic member applied to the first switch valve is weaker than elastic force of the elastic member applied to the second switch valve.

18. The hydraulic pressure supply system of claim 15, wherein the second switch valve is controlled by control pressure of a third solenoid valve and elastic force of an elastic member counteracting against the control pressure.

* * * * *